(12) United States Patent
Efrati et al.

(10) Patent No.: US 7,406,536 B2
(45) Date of Patent: Jul. 29, 2008

(54) DYNAMIC POWER LINE ACCESS CONNECTION

(75) Inventors: Ofir Efrati, Raanana (IL); Yeshayahu Zalitzky, Raanana (IL)

(73) Assignee: Main.Net Communications Ltd., RaAnana (IL)

( * ) Notice: Subject to any disclaimer, the term of this patent is extended or adjusted under 35 U.S.C. 154(b) by 648 days.

(21) Appl. No.: 10/484,932

(22) PCT Filed: Jul. 23, 2002

(86) PCT No.: PCT/IL02/00610

§ 371 (c)(1),
(2), (4) Date: Sep. 10, 2004

(87) PCT Pub. No.: WO03/010896

PCT Pub. Date: Feb. 6, 2003

(65) Prior Publication Data

US 2005/0008028 A1    Jan. 13, 2005

Related U.S. Application Data (63) Continuation-in-part of application No. 10/344,474, filed on Feb. 12, 2003, now Pat. No. 6,995,657.

(60) Provisional application No. 60/307,251, filed on Jul. 23, 2001.

(51) Int. Cl.
*G06F 15/173* (2006.01)
*H04L 12/28* (2006.01)
*H04L 12/413* (2006.01)
*H04Q 7/20* (2006.01)

(52) U.S. Cl. .......... 709/238; 709/225; 370/392; 370/445; 370/455; 455/436

(58) Field of Classification Search .......... None
See application file for complete search history.

(56) References Cited

U.S. PATENT DOCUMENTS

| | | | |
|---|---|---|---|
| 4,638,298 A | | 1/1987 | Spiro |
| 4,642,607 A | | 2/1987 | Strom et al. |
| 4,709,339 A | | 11/1987 | Fernandes |
| 4,745,391 A | | 5/1988 | Gajjar |
| 5,359,595 A | | 10/1994 | Weddle et al. |
| 5,465,399 A | * | 11/1995 | Oberholtzer et al. .......... 455/69 |
| 5,559,377 A | | 9/1996 | Abraham |

(Continued)

FOREIGN PATENT DOCUMENTS

| | | |
|---|---|---|
| EP | 0 395 495 | 10/1990 |
| EP | 0 852 419 | 7/1998 |
| EP | 0 975 097 | 1/2000 |

OTHER PUBLICATIONS

HomePlug Powerline Alliance; "Release VA.2.1 Medium Interface Specification," Oct. 30, 2001; pp. 1-139.

*Primary Examiner*—Wen-Tai Lin (57) ABSTRACT

A method of connecting a power line modem to an external network. The method includes receiving, by the power line modem, a plurality of packets directly transmitted from a plurality of neighboring devices connected to the power lines, determining for each of the plurality of neighboring devices, a cost of a route to an access unit, through the neighboring device, responsive to the received packets, and selecting an access unit to service the power line modem, responsive to the determination of the costs.

19 Claims, 3 Drawing Sheets

U.S. PATENT DOCUMENTS

| | | |
|---|---|---|
| 5,630,204 A | 5/1997 | Hylton et al. |
| 5,818,821 A | 10/1998 | Schurig |
| 5,828,847 A | 10/1998 | Gehr et al. |
| 5,892,795 A * | 4/1999 | Paret .......................... 375/222 |
| 5,929,750 A | 7/1999 | Brown |
| 5,978,371 A | 11/1999 | Mason, Jr. et al. |
| 6,040,759 A | 3/2000 | Sanderson |
| 6,101,214 A | 8/2000 | Hershey et al. |
| 6,144,292 A | 11/2000 | Brown |
| 6,194,996 B1 | 2/2001 | Okazaki et al. |
| 6,407,987 B1 | 6/2002 | Abraham |
| 6,452,482 B1 | 9/2002 | Cern |
| 6,529,120 B1 | 3/2003 | Bilenko et al. |
| 7,058,716 B1 * | 6/2006 | Sundaresan et al. ......... 709/225 |
| 2002/0177460 A1 * | 11/2002 | Beasley et al. .............. 455/502 |
| 2004/0047335 A1 * | 3/2004 | Proctor et al. ................ 370/351 |

* cited by examiner

DYNAMIC POWER LINE ACCESS CONNECTION

RELATED APPLICATIONS

The present application is a U.S. national application of PCT application No. PCT/IL02/00610, filed on Jul. 23, 2002. The PCT application claims the benefit under §119(e) of U.S. Provisional Application No. 60/307,251, filed on Jul. 23, 2001 the disclosure of which document is incorporated herein by reference. The present application is also a continuation-in-part (CIP) of U.S. patent application Ser. No. 10/344,474, filed on Feb. 12, 2003, now U.S. Pat. No. 6,995,657, the disclosure of which is incorporated herein by reference.

FIELD OF THE INVENTION

The present invention relates to signal transmission over power lines.

BACKGROUND OF THE INVENTION

Electric power lines can be used to access external (backbone) communication networks, such as the Internet. For example, EP patent publication 0 975 097, the disclosure of which is incorporated herein by reference, describes a method of exchanging data between a customer and a service provider over low and medium voltage AC electric power networks.

In forming electrical access power connections, similar to asynchronous digital subscriber line (ADSL) connections, each user is provided with a home electrical power modem for connection to the power lines within the user's home or office. In addition, a service provider locates an access modem on the electric power lines at a connection point to the external network, near the user's home. Some service providers connect more than one home electrical power modem to a single access modem in order to reduce the number of access modems required. The maximal distance between the home modems and the access modem is, however, limited, due to the relatively high level of noise on electrical power lines.

SUMMARY OF THE INVENTION

An aspect of some embodiments of the present invention relates to a user-end power-line modem which dynamically chooses the access niodem from which to receive access service. Optionally, the user-end modem is not configured with a specific group of access modems from which to receive service, but rather selects the access modem based on a query of neighboring devices.

In some embodiments of the invention, the user-end modem chooses between one or more access modems within a communication distance from the user-end modem and one or more access modems beyond a distance allowing direct communication (i.e., without passing through one or more other devices serving as repeaters), but connectable through one or more repeaters. The repeaters optionally transmit messages they receive onto the same power lines from which the messages were received. The repeaters may be dedicated devices used only for repeating and/or may be other end-user modems and/or access modems. In these embodiments, a service provider does not need to locate a plurality of access modems within a communication distance from each user-end modem, in order to provide service or service redundancy.

In some embodiments of the invention, the access modems belong to a plurality of different service providers and/or connect to a plurality of different types of backbone networks. Alternatively or additionally, at least some of the access modems belong to the same service providers and/or connect to the same backbone network.

The user-end modem optionally transmits route query packets on the power line, in order to determine the available routes to access modems and a cost associated with each route. Neighboring devices optionally respond to the query packets with routing information they have on the connection to one or more access units. The querying user-end modem optionally selects an access unit from which to receive service according to the responses.

In some embodiments of the invention, the query packets are transmitted in a plurality of power levels, which levels affect the number of neighboring devices on the one hand and the extent of the power line segment which cannot be used concurrently with querying user-end modem.

The cost associated with each route optionally is a function of the number of intermediate devices between the user modem and the access unit and/or the data rate along the route between the user modem and the access unit. Alternatively or additionally, the cost of a route depends on the transmission power level required to communicate between the devices along the route.

There is therefore provided in accordance with an embodiment of the present invention, a method of connecting a power line modem to an external network, comprising receiving, by the power line modem, a plurality of packets directly transmitted from a plurality of neighboring devices connected to the power lines, determining for each of the plurality of neighboring devices, a cost of a route to an access unit, through the neighboring device, responsive to the received packets, and selecting an access unit to service the power line modem, responsive to the determination of the costs.

Optionally, at least one of the neighboring devices comprises an access unit. Alternatively, at least one of the neighboring devices is not an access unit. Optionally, at least one of the neighboring devices comprises a second user modem. Optionally, determining for the plurality of neighboring devices the cost of a route to an access unit comprises determining for a plurality of the neighboring devices the cost of routes to a single access unit. Optionally, determining for the plurality of neighboring devices the cost of a route to an access unit comprises determining for a plurality of the neighboring devices the cost of routes to a plurality of different access units.

Optionally, selecting the access unit comprises selecting responsive to the determined cost and responsive to one or more parameters of the different access units. Optionally, selecting the access unit comprises selecting responsive to the determined cost and responsive to the load on the different access units. Alternatively or additionally, selecting the access unit comprises selecting responsive to the determined cost and responsive to the external networks to which the different access units lead.

Optionally, the received plurality of packets are generated by the neighboring devices, periodically, without receiving prompting messages from the power line modem.

Alternatively or additionally, the method includes transmitting one or more network discovery packets on the power line and wherein the received plurality of packets are generated responsive to at least one of the one or more discovery packets. Optionally, transmitting the one or more network discovery packets comprises transmitting a plurality of packets with different transmission power levels. Optionally, the method includes determining for each of the power levels a number of devices responding to the transmitted packet with that power level.

Optionally, transmitting the one or more network discovery packets comprises transmitting with increasing power levels until a route with a cost beneath a predetermined threshold is found. Optionally, determining the cost comprises determining the cost responsive to a number of intermediate devices along the route to the access unit. Optionally, determining the cost comprises determining the cost responsive to a data rate of one or more hops of the route to the access unit.

Optionally, determining the cost comprises determining the cost responsive to a power level required to communicate with the neighboring device. Optionally, determiiing the cost comprises determining the cost responsive to a number of neighboring devices of the modem at the required power level. Optionally, determining the cost comprises determining a neighbor segment cost of a network segment between the power line modem and a neighboring device and adding the neighbor segment cost to an access cost of a segment from the neighboring device to an access unit, which access cost is received from the neighboring device. Optionally, the selected access unit is not within a transmission range of the power line modem.

There is further provided in accordance with an embodiment of the present invention, a power line modem, comprising a power line interface for receiving packets from the power line and a controller adapted to receive a plurality of packets directly transmitted from a plurality of neighboring devices connected to the power lines; to determine, for the plurality of neighboring devices, a cost of a route to an access unit, through the neighboring device, responsive to the received packets; and to select an access unit from which to receive service, responsive to the determination of the costs.

BRIEF DESCRIPTION OF FIGURES

Particular exemplary embodiments of the invention will be described with reference to the following description, in conjunction with the figures, wherein identical structures, elements or parts which appear in more than one figure are preferably labeled with a same or similar number in all the figures in which they appear, in which.

DETAILED DESCRIPTION OF EMBODIMENTS

Figure 1:
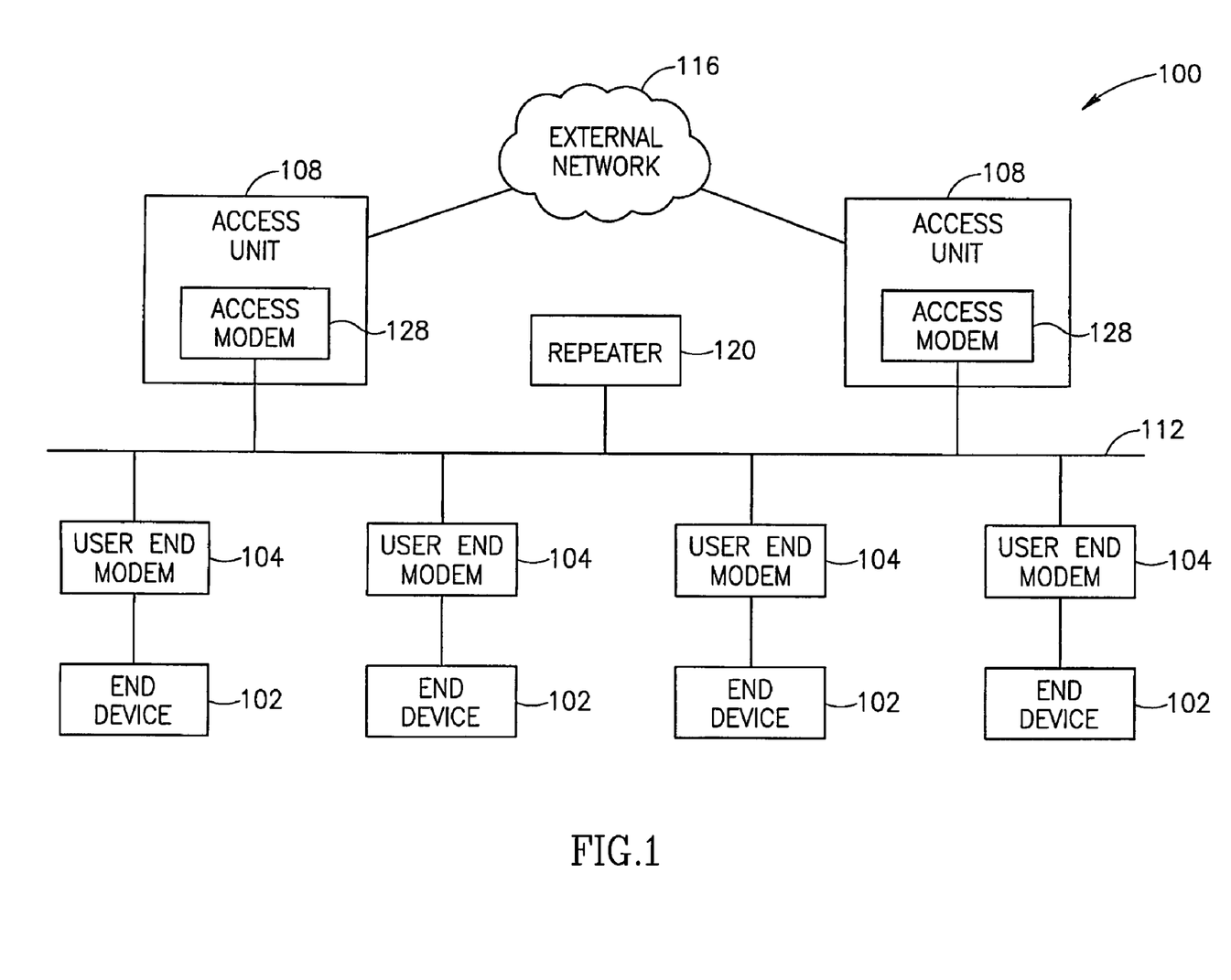
FIG. 1 is a schematic block diagram of a transmission system utilizing electric power lines, in accordance with an embodiment of the present invention.

FIG. 1 is a schematic block diagram of a transmission system 100 utilizing an electric power line 112, in accordance with an embodiment of the present invention. Communication end devices 102 (e.g., computers, telephones, video conferencing units) connect through power line 112 to one or more external networks 116. A plurality of access units 108 along power line 112 serve as gateways to the one or more external networks 116. Access units 108 may all belong to a single service provider or may be employed by a plurality of different service providers. Each access unit 108 may connect to a single external network 116 (as shown) or to a plurality of external networks 116.

External networks 116 may include data networks, such as the Internet, switched networks, such as telephone networks and/or any other communication networks. In some embodiments of the invention, one or more of external networks 116 uses electrical power lines for carrying signals. Alternatively or additionally, external networks 116 use any other communication medium, such as optical fibers, twin pairs and/or cable wires.

In some embodiments of the invention, power line 112 serves as a multi-device link, allowing to connect three or more devices to each other. Generally in multi-device links, all the devices connected to the multi-device link can hear the signals transmitted by all the other devices. It is noted, however, that on power line 112, due to the high noise levels, devices generally receive signals from nearby devices and not from more remote devices.

End devices 102 optionally connect to power line 112 through respective user-end modems 104. Access units 108 optionally include an access modem 128, which may be a stand alone modem or may be included in a modem array, such as a remote access server (RAS).

Power line 112 generally has changing noise and attenuation conditions. In addition, some power connections may be shut down due to maintenance handling of the power lines. In some embodiments of the invention, some or all of user end modems 104 and access modems 128 serve additionally as repeaters which retransmit data packets they receive back onto power line 112, toward the destination of the data packets. Thus, a user end modem 104 can communicate with an access modem 128 distanced from it beyond a direct communication range. Alternatively or additionally, system 100 includes one or more repeaters 120 which do not serve as user or access modems.

As described below, each modem 104 determines, at start up and/or periodically, an access unit 108 through which it connects to external network 116. The modem 104 optionally also determines a route to the access unit 108. The route may be a direct transmission route or may pass through one or more other devices, e.g., repeaters 120, modems 104 and access units 108. Optionally, each modem along the route keeps track of the next device along the route. When a packet is transmitted from modem 104 to access unit 108, modem 104 optionally forwards the packet to the next device along the route. That next device forwards the packet to a following device along the route, until the packet reaches its destination. Thus, each device along the route does not necessarily have a record of the entire route.

Each access unit 108 optionally assigns to the devices it services a dynamic address to be used by the device in identifying before access unit 108. Access unit 108 optionally also assigns itself a dynamic address. The dynamic address of the assigning access unit 108 may have a predetermined value (e.g., 1) or may be assigned randomly or using any other method. Optionally, each of the devices in system 100 is additionally identified by its MAC Ethernet address which is preconfigured in the device at the time of manufacture. The MAC Ethernet address optionally appears in requests for assigning a dynamic address, as described below, and/or in a payload portion of packets transmitted on power line 112. Thus, in an exemplary embodiment of the invention, two types of addresses are used to identify devices in system 100. An exemplary method of assigning the dynamically assigned addresses to the devices of system 100 is described hereinbelow.

Figure 2:
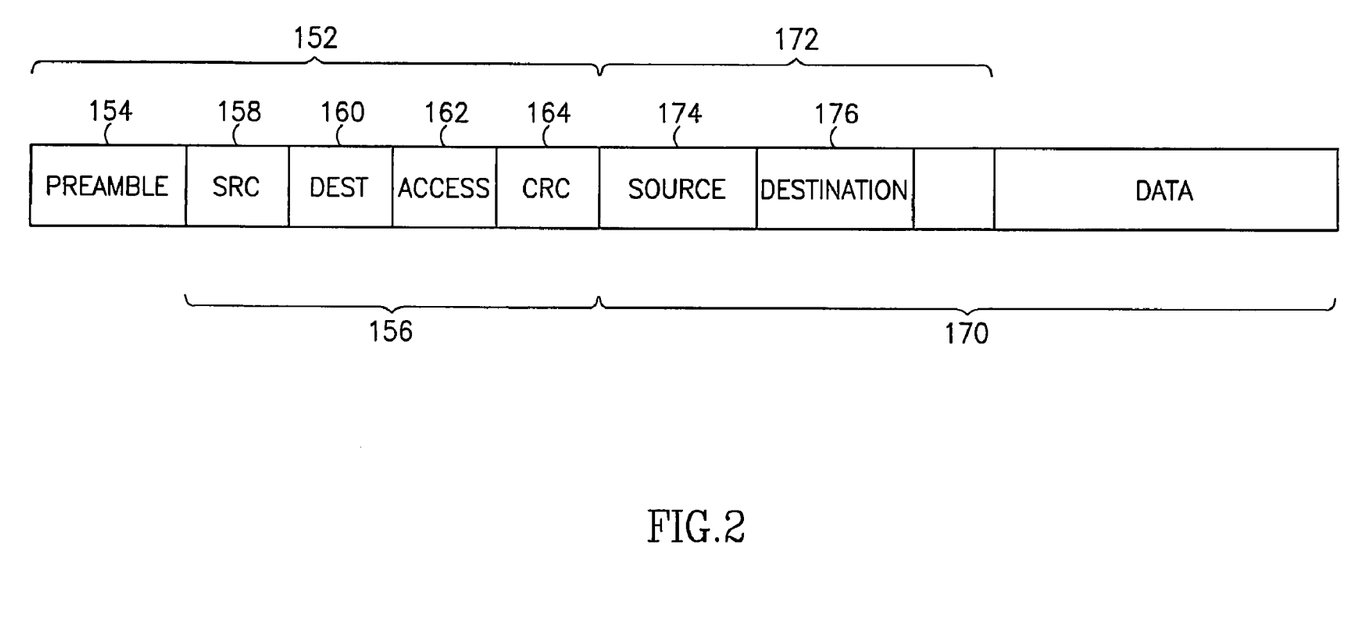
FIG. 2 is a schematic illustration of a data packet transmitted on a power line, in accordance with an embodiment of the present invention.

FIG. 2 is a schematic illustration of a data packet transmitted on power line 112, in accordance with an embodiment of the present invention. The data packet of FIG. 2 optionally includes a delimiter 152 formed of a constant preamble 154 and a delimiter header 156. Delimiter header 156 optionally states the source (SRC) 158 and destination (DST) 160 of the packet. Optionally, the source and destination of the packet are stated using dynamic addresses assigned to the source and destination devices by their access unit 108. The use of the dynamically assigned addresses allows use of relatively short addresses, e.g., between 7 to 10 bits, such that the delimiter header can be kept short (e.g., 25 bits). In some embodiments of the invention, the delimiter header further includes an identification field 162 of the access unit 108 assigning the dynamic addresses to the source and destination. An error check field (e.g., FCCS, CRC) 164 is optionally also included in delimiter header 156.

The identification values of access units 108 stated in field 162, are optionally values configured by a human operator. Alternatively, when an access unit 108 is connected to power lines 112 it queries the neighboring devices to determine which numbers are already used for field 162 in its vicinity. The new access unit then selects, for example randomly, a number not used in the vicinity.

In addition to delimiter 152, the packet of FIG. 2 optionally includes a payload 170 carrying the data of the packet. Optionally, payload 170 includes a payload header 172, which includes an original source field 174 and a final destination field 176. Address fields 174 and 176 optionally use the dynamically assigned addresses used in delimiter header 156. Alternatively or additionally, address fields 174 and/or 176 use globally unique address values, such as the 6 byte MAC Ethernet addresses.

Not all packets transmitted on power line 112 have the form shown in FIG. 2. For example, some control packets may include only delimiter 152 and do not include a payload 170. In addition, some payloads 170 may not include address fields 174 and 176. For example, when a stream of fragments of an original packet are transmitted together, address fields 174 and 176 may be included only in one of the fragments. Furthermore, the packet of FIG. 2 is brought only by way of example, and other packet formats may be used in accordance with the present invention.

In some embodiments of the invention, in transmitting a packet from a modem 104 to access unit 108, modem 104 generates payload 170 of the packet including the original source and final destination addresses of the modem 104 and the access unit 108, respectively. In addition, modem 104 prepares the delimiter header 156 of the packet, stating the identity of access unit 108 in identification field 162, the dynamic address of modem 104 as source 158 and the next device along the route to access unit 108 as destination 160. The next device along the route optionally leaves payload 170 unchanged, but replaces the delimiter header 156, such that the source is the address of the next device (currently handling the packet) and the destination is the dynamic address of a further device along the route. The direction in which to forward the packet is optionally determined from the destination address field 176 in the payload 170 of the packet.

In some embodiments of the invention, each device in system 100 is registered in a single access unit 108 and communicates only with devices registered at the same access unit 108. Optionally, when a modem 104 needs to communicate with another modem 104 assigned to a different access unit 108, the communication is performed using a different protocol than used for communicating with access unit 108, for example as described in PCT application PCT/IL02/00582, titled "Dual Purpose Power Line Modem", filed Jul. 17, 2002, the disclosure of which is incorporated herein by reference. Alternatively or additionally, any communication between peer modems 104 uses a different protocol than used for communicating with access unit 108, regardless of the access units 108 at which the peer modems are registered. Further alternatively or additionally, different protocols may be used in communicating with different access units 108.

Alternatively or additionally, some of the devices of system 100 (e.g., modems 104, repeaters 120 and/or access units 108) have a plurality of dynamic addresses registered at different access units 108, and these devices are used as bridges in communicating between modems 104 registered in different access units 108. In an exemplary embodiment of the invention, each repeater 120 registers with all access units 108 that are within a predetermined number of hops from the repeater. Optionally, for each access unit 108, repeaters 120 manage a routing table which identifies the dynamic address of the next device to be used for each modem 104 having a route through the repeater to access unit 108 and/or the next device for each access unit 108. Thus, repeaters 120 can be used to lead packets to different access units 108. This possibility is especially useful when neighboring modems 104 need to receive service from different access units 108, for example access units belonging to different service providers and/or leading to different external networks.

In some embodiments of the invention, each user-end modem 104 manages a mapping table, which is used in selecting an access unit 108 to service the modem, for example using the method described below. Optionally, the mapping table includes an entry for each neighboring device of the modem, i.e., for each device which is in direct transmission range from the modem (including devices not registered to the same access unit 108). In each entry, the table optionally lists an access unit 108 to which the neighboring device is assigned and/or an access unit having a lowest cost path from the device. In addition, each entry optionally includes data on the route to the access unit and/or data on the access unit. The data on the route optionally includes the neighboring device leading to the access unit and/or a cost of the route. The data on the access unit optionally includes the service provider maintaining the access unit, the external network (or networks) to which the access unit connects and/or the price charged by the service provider of the access unit.

In some embodiments of the invention, each entry of the mapping table includes a master field, which defines a device through which the route to access unit 108 must pass. The use of the master field may be optional or mandatory. The master device may be an access unit 108 to which the modem 104 must connect and/or an intermediate device through which the connection must pass. The master device may be defined, for example, when too many fluctuations in the routing path are not desired and/or when the master device is required for a specific task, for example for monitoring the data of the end user. Alternatively or additionally, the master device defines a specific access unit which must be used, for example when only that access unit leads to a desired external network 116.

Each entry of the mapping table optionally includes a time stamp field identifying the last time in which the route was verified with the neighboring device and/or the most recent time at which the communication with the neighboring device was verified. Optionally, entries older than a predetermined amount of time, for example 10 minutes, are removed from the table. In some embodiments of the invention, before removing an entry from the table, modem 104 attempts to communicate with the neighboring device of the entry. When an entry relating to the access unit 108, currently servicing the modem, is removed from the table, a different access unit 108 is selected. Modem 104 optionally transmits a provisioning request to the newly selected access unit 108, as described below with reference to FIG. 3.

Alternatively to the mapping table having an entry for each neighboring device, the mapping table has an entry for each access unit 108. For each access unit 108, the table optionally lists the best (e.g., lowest cost) neighboring device through which to access the access unit 108. Further alternatively, the mapping table has an entry for each pair of access unit 108 and neighboring device, such that backup data is always available in case of changes in the network map (e.g., failure of a device) and there is no need to wait for a new network discovery procedure.

Figure 3:
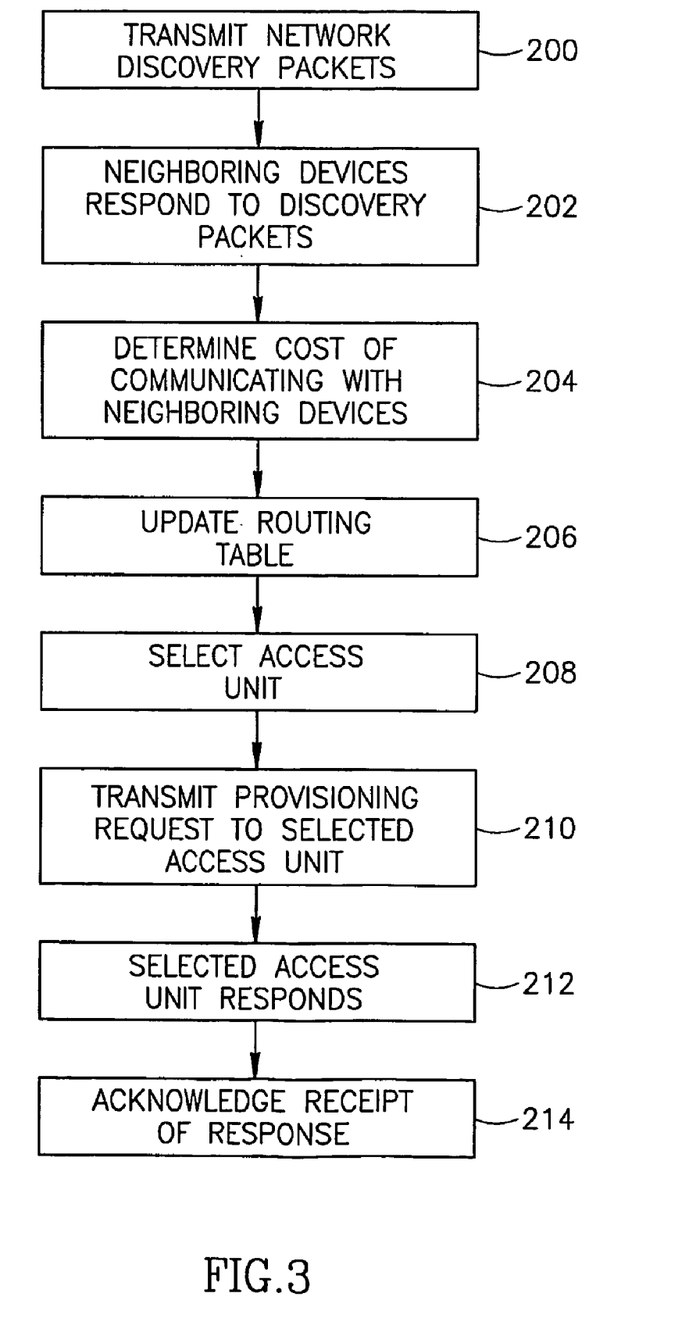
FIG. 3 is a flowchart of acts performed in provisioning and selecting an access unit, in accordance with an embodiment of the present invention.

FIG. 3 is a flowchart of acts performed by a user-end modem 104 and its neighboring devices, in selecting an access unit 108 from which to receive service, in accordance with an embodiment of the present invention. Optionally, modem 104 transmits (200) one or more broadcast network discovery packets on power lines 112. The neighboring devices (e.g., other user-end modems 104, repeaters 120, access modems 128) receiving the network discovery packet respond (202) on power lines 112 with a response including information they include in their mapping table. In some embodiments of the invention, modem 104 determines (204) the cost of communicating with each of the responding devices. According to the determined cost and the received responses, the mapping table of modem 104 is updated (206).

Based on the updated mapping table, an access unit 108 to service modem 104 is optionally selected (208). The selection is optionally performed solely based on the cost. Alternatively, the selection is based on other information, such as the QoS policy of access unit 108 and/or the load on the access unit.

In some embodiments of the invention, modem 104 transmits (210) to the selected access unit 108 a provisioning request, which requests the access modem 108 to provide access service to the modem 104. The provisioning request is optionally transmitted to access unit 108 along the determined route, as described above regarding data packets.

The selected access unit 108 optionally responds (212) to the provisioning request with a provisioning authorization message. The provisioning authorization message optionally includes the dynamic address assigned to the requesting modem 104. The intermediate devices along the route from access unit 108 to requesting modem 104, if such intermediate devices exist, optionally register the identity of the requesting modem 104 and the neighboring device to which packets directed to that modem are to be forwarded. The registered identity and neighboring device used to route to it, referred to herein as routing data, are optionally used in forwarding data packets from access unit 108 to modem 104.

In some embodiments of the invention, the provisioning authorization message includes information on the VLANs supported by access unit 108, the QoS of the access unit, its IP configuration and/or other unit parameters. This information may be general for all modems handled by access unit 108 and/or may include specific parameters for the specific modem 104.

Modem 104 optionally acknowledges (214) the receipt of the provisioning authorization message.

The method of FIG. 3 is optionally performed each time modem 104 is operated and/or when the access unit 108 currently servicing modem 104 does not respond for over a predetermined amount of time. Alternatively or additionally, the method of FIG. 3 is performed periodically, for example every 5-10 minutes. In some embodiments of the invention, each time the method of FIG. 3 is performed, a provisioning request is transmitted (210) to a selected access unit 108. Alternatively, a provisioning request is transmitted only when the selected access unit 108 is different from the access unit currently used by the modem 104, if there is such an access unit 108.

In some embodiments of the invention, an access unit 108 which is different from the currently used access unit is selected only if the cost of the selected access unit is substantially lower than the currently used access unit, for example by 25-40%. Thus, resources are not spent on changing the access unit 108 used, for a small gain. Alternatively, a change in the access unit 108 used, is performed even when a marginal gain in cost is involved, so as to continuously provide best communication service possible.

Referring in more detail to transmitting (200) the one or more network discovery packets, in some embodiments of the invention, a sequence of two to four discovery packets are transmitted, in order to reduce the chances of packet loss. Alternatively or additionally, if fewer than a predetermined number of responses are received, modem 104 repeats the transmission of the network discovery packet (or packets). In some embodiments of the invention, the predetermined number of required responses which causes modem 104 to stop retransmitting is one. Alternatively, at least two, three or more responses are required, so as to allow for redundancy and/or better selection of an access unit 108. The more data available to modem 104, the better the selection of a lowest cost path to an access unit 108. In some embodiments of the invention, repeating the transmission is performed in predetermined interval periods, e.g., every 2-4 seconds. Alternatively or additionally, repeating the transmissions is performed in increasing durations and/or using any repetition scheme known in the art. Optionally, the repetitions are stopped after a predetermined time, for example, after 60 seconds, at which time it is assumed that all the neighboring units have responded (e.g., there are no available neighboring devices).

In some embodiments of the invention, the network discovery packet may indicate a specific service provider which must be used by modem 104. Optionally, in such cases, all responses include only information relating to the specific service provider. In some embodiments of the invention, only devices assigned to an access unit 108 belonging to the specified service provider respond. Alternatively, devices assigned to an access unit 108 not belonging to the specified service provider, respond with information on an access unit 108 belonging to the specified service provider, although the device is not assigned to that access unit. Optionally, in this alternative, if modem 104 chooses to form a route to an access unit through the responding neighboring device, the neighboring device serves as a repeater for the packets of modem 104, although the neighboring device is not assigned to the same access unit as modem 104. Alternatively or additionally, if possible, the neighboring device registers with the access unit selected by modem 104 instead of the access unit 108 to which it was registered.

Further alternatively, all devices respond, such that the modem 104 is notified of the existence of the neighboring devices. Alternatively or additionally, the broadcast message may indicate a specific access unit 108 which is to be used and/or a specific master device which must be used.

In some embodiments of the invention, the network discovery message is transmitted at the lowest transmission rate and/or in a robust transmission format used in system 100, such that the chances of receiving responses is maximized.

In some embodiments of the invention, instead of transmitting the network discovery packet, each device connected to power line 112 periodically transmits network description packets including the information in their mapping table. A modem 104 connecting to the network listens for these packets and accordingly selects an access unit 108. Optionally, if after a predetermined amount of time modem 104 did not receive any network description packets, the modem transmits a network discovery packet, to which the neighboring devices are to immediately respond.

Referring in more detail to the devices responding (202) to the network discovery packets, in some embodiments of the invention, each response packet identifies a single best access unit 108 and provides data only for that unit. Alternatively, each response packet includes the entire mapping table of the responding device. The response optionally also comprises information identifying the responding device, for example the Ethernet MAC address of the device and/or a dynamically provided address of the device in system 100.

For each access unit 108 identified by the response, the response optionally includes an address of the access unit 108, a cost of accessing the access unit from the responding device, a provider name of the access unit and a time stamp of the provided data. Alternatively or additionally, the data for each access unit 108 includes a set of virtual local area networks (VLANs) the access unit supports, a quality of service (QoS) policy of the access unit and/or a current load indication of the access unit. In some embodiments of the invention, the address of the access unit 108 comprises an Ethernet MAC address. Alternatively or additionally, the address of the access unit 108 comprises an address dynamically selected by the access unit, within system 100.

Referring in more detail to determining (204) the cost of communicating with each of the responding devices, in some embodiments of the invention, the cost is determined from the responses. Optionally, the response packet is analyzed to determine the channel quality from the responding device to modem 104. In some embodiments of the invention, the response includes a special sequence content which is used for determining the channel quality. Alternatively or additionally, the fields of the packet used for transferring the response are also used in determining the channel quality. In some embodiments of the invention, the responses include a time stamp from which the delay of the packet is determined. Optionally, modem 104 compares the time stamp of the packet to the current time and accordingly determines the round trip delay (RTD) to the neighboring unit. The RTD is optionally used in calculating the cost of the route to the neighboring device.

Alternatively or additionally, modem 104 transmits to some or all of the responding devices, channel quality estimation packets, separate from the network query packets and their responses. The responses to the channel quality estimation packets are optionally used in determining (204) the cost of communicating with the responding device.

Referring in more detail to updating (206) the mapping table, in some embodiments of the invention, the cost of each access unit 108 is determined as the sum of the cost received from the responding device (i.e., the cost of the path from the access unit 108 to the neighboring device) together with the cost of communicating with the responding device. Optionally, each table entry indicates the number of hops required to reach the access unit 108. The number of hops is optionally determined as the number of hops received from the responding device plus 1, for the hop from the neighboring device to modem 104. In some embodiments of the invention, access units 108 requiring more than a predetermined number of hops are not taken into consideration. Alternatively or additionally, the number of hops required to reach each access unit is taken into account in determining the cost of the path to the access unit.

In some embodiments of the invention, the cost of the route between a modem 104 and an access unit 108 is a function of the number of intermediate devices along the route and the bit rate of the hops (i.e., the segments connecting two devices along the route) of the route. The cost of the route is optionally a function, only or mainly (regarding the bit rate portion of the function), of the lowest bit rate along the route, as this lowest bit rate is a bottleneck of the route. Alternatively or additionally, the cost of the route is a function of the average bit rate of the route, since the higher bit rate hops reduce the number of packets required and thus reduce the chances of collisions on power line 112, even if the bottleneck prevents achieving faster transmission. Alternatively or additionally, the cost of the route is determined based on round trip delay measurements, as described above.

In an exemplary embodiment of the present invention, the cost is defined by:

$$\cos t = k \cdot \sum_i \frac{1}{\text{bit rate of hop } i}$$

where i runs over all the hops between modem 104 and access unit 108 and k is a constant.

In some embodiments of the invention, the network discovery packets are transmitted without a dynamic address of modem 104, as in some cases (e.g., a newly connected modem) such an address was not yet assigned. Alternatively or additionally, when the network discovery packets are transmitted for update purposes by a modem 104 already having a dynamic address, the dynamic address is included in the network discovery packets. Optionally, the network discovery packets include in their payload the Ethernet MAC address of modem 104 for identification of modem 104. The response packets are optionally transmitted as broadcast packets carrying the source dynamic address of the responding device. Optionally, only modems 104 that recently transmitted network discovery packets examine these response packets to determine if they are directed to them.

The provisioning request is optionally transmitted to the neighboring device leading to the selected access unit 108 without a dynamic source address, but with a source Ethernet MAC address in the payload. The provisioning authorization message including the dynamic address of the modem 104 is optionally transmitted from the neighboring device to the modem 104 as a broadcast message. Thereafter, the modem 104 can use its dynamic address for all further communications.

In some embodiments of the invention, user-end modems 104 may adjust their transmission power level, so as to control the range of devices which receive the packets transmitted by the modem 104 and hence the range of devices to which transmissions of modem 104 interfere. The data rate of the transmission between two devices optionally depends on the power level used for the transmission. Thus, in some cases, the data rate may be increased by increasing the transmission power. The control of the transmission power level is optionally performed as described in the above mentioned PCT publication WO 02/15413.

In some embodiments of the invention, the mapping table includes for each entry, an indication of the transmission power level required for reaching the neighboring device of the entry. Optionally, in these embodiments, transmitting (200) the one or more network discovery packets comprises transmitting packets at a plurality of different power levels.

The power level required for communicating with each neighboring device is optionally determined as the lowest power level to which the neighboring device responded. In some embodiments of the invention, the method of FIG. 3 is started with transmitting network discovery packets with a low transmission power. If a sufficient number of responses, optionally with sufficiently high data rates, are not received, the transmission of network discovery packets is repeated with a higher transmission power. This process is optionally repeated until a sufficient number of responses is received and/or a predetermined power level is reached. Alternatively, a plurality of network discovery packets are transmitted at a predetermined set of power levels, and the number of power levels used does not depend on the received responses.

Each entry of the mapping table optionally lists a best pair of power level and data rate determined for the connection between modem 104 and the neighboring device. Alternatively, each entry lists a plurality of pairs of power levels and data rates.

In some embodiments of the invention, the selecting (208) of the access unit 108 depends on the power level used to contact the neighboring device leading to the selected access unit 108. Optionally, a neighboring device and access unit 108 having a best cost with a lowest transmission power level are selected, provided the cost of the path is lower than a predetermined threshold value. If the best cost is not lower than the threshold, a higher power level is optionally used. Alternatively, a higher transmission power level is used when the ratio between the cost reduction and the power increase is greater than a predetermined value. Further alternatively or additionally, the cost is a function of the power level. In an exemplary embodiment of the invention, the cost increases with the number of devices that neighbor modem 104 for the power level used. The more neighboring devices there are, the larger the area which cannot transmit packets concurrently with modem 104. The number of neighboring devices is optionally determined according to the number of devices responding to the network discovery packets transmitted at the power level.

It will be appreciated that the above described methods may be varied in many ways, including, changing the order of acts, and/or performing a plurality of acts concurrently. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. For example, the method of FIG. 3 may be used by repeaters 120 and/or access units 108 (e.g., when their connection to external network 116 is not operable), in registering to an access unit 108. It should be understood that features and/or acts described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the limitations used in the claims. When used in the following claims, the terms "comprise", "include", "have" and their conjugates mean "including but not limited to".

The invention claimed is:

1. A method of connecting a power line modem to an external network, comprising:
    receiving, by the power line modem, a plurality of packets directly transmitted from a plurality of neighboring devices connected to a power line network;
    selecting, by the power line modem, an access unit to service the power line modem, responsive to the received packets from the plurality of neighboring devices; and
    transmitting one or more network discovery packets on the power line and wherein the received plurality of packets are generated responsive to at least one of the one or more discovery packets,
    wherein transmitting the one or more network discovery packets comprises transmitting a plurality of packets with different transmission power levels.

2. A method according to claim 1, comprising determining for each of the power levels a number of devices responding to the transmitted packet with that power level.

3. A method of connecting a power line modem to an external network, comprising:
    receiving, by the power line modem, a plurality of packets directly transmitted from a plurality of neighboring devices connected to a power line network;
    selecting, by the power line modem, an access unit to service the power line modem, responsive to the received packets from the plurality of neighboring devices; and
    transmitting one or more network discovery packets on the power line and wherein the received plurality of packets are generated responsive to at least one of the one or more discovery packets,
    wherein transmitting the one or more network discovery packets comprises transmitting with increasing power levels until a route with a cost beneath a predetermined threshold is found.

4. A method according to claim 1, wherein at least one of the neighboring devices comprises an access unit.

5. A method according to claim 1, wherein at least one of the neighboring devices is not an access unit.

6. A method according to claim 5, wherein at least one of the neighboring devices comprises a second user modem.

7. A method according to claim 1, comprising determining for each of the plurality of neighboring devices, a cost of a route to an access unit, through the neighboring device, responsive to the received packets and wherein selecting the access unit is performed responsive to the determination of the costs.

8. A method according to claim 7, wherein determining for the plurality of neighboring devices the cost of a route to an access unit comprises determining for a plurality of the neighboring devices the cost of routes to a single access unit.

9. A method according to claim 7, wherein determining for the plurality of neighboring devices the cost of a route to an access unit comprises determining for a plurality of the neighboring devices the cost of routes to a plurality of different access units.

10. A method according to claim 9, wherein selecting the access unit comprises selecting responsive to the determined cost and responsive to one or more parameters of the different access units.

11. A method according to claim 10, wherein selecting the access unit comprises selecting responsive to the determined cost and responsive to the load on the different access units.

12. A method according to claim 10, wherein selecting the access unit comprises selecting responsive to the determined cost and responsive to the external networks to which the different access units lead.

13. A method according to claim 7, wherein determining the cost comprises determining the cost responsive to a number of intermediate devices along the route to the access unit.

14. A method according to claim 7, wherein determining the cost comprises determining the cost responsive to a data rate of one or more hops of the route to the access unit.

15. A method according to claim 7, wherein determining the cost comprises determining the cost responsive to a power level required to communicate with the neighboring device.

16. A method according to claim 15, wherein determining the cost comprises determining the cost responsive to a number of neighboring devices of the modem at the required power level.

17. A method according to claim 7, wherein determining the cost comprises determining a neighbor segment cost of a network segment between the power line modem and a neighboring device and adding the neighbor segment cost to an access cost of a segment from the neighboring device to an access unit, which access cost is received from the neighboring device.

18. A method according to claim 1, wherein the received plurality of packets are generated by the neighboring devices, periodically, without receiving prompting messages from the power line modem.

19. A method according to claim 1, wherein the selected access unit is not within a transmission range of the power line modem.

* * * * *